H. J. PEELE.
CABLE SUSPENSION.
APPLICATION FILED MAR. 10, 1917.
1,301,496.
Patented Apr. 22, 1919.
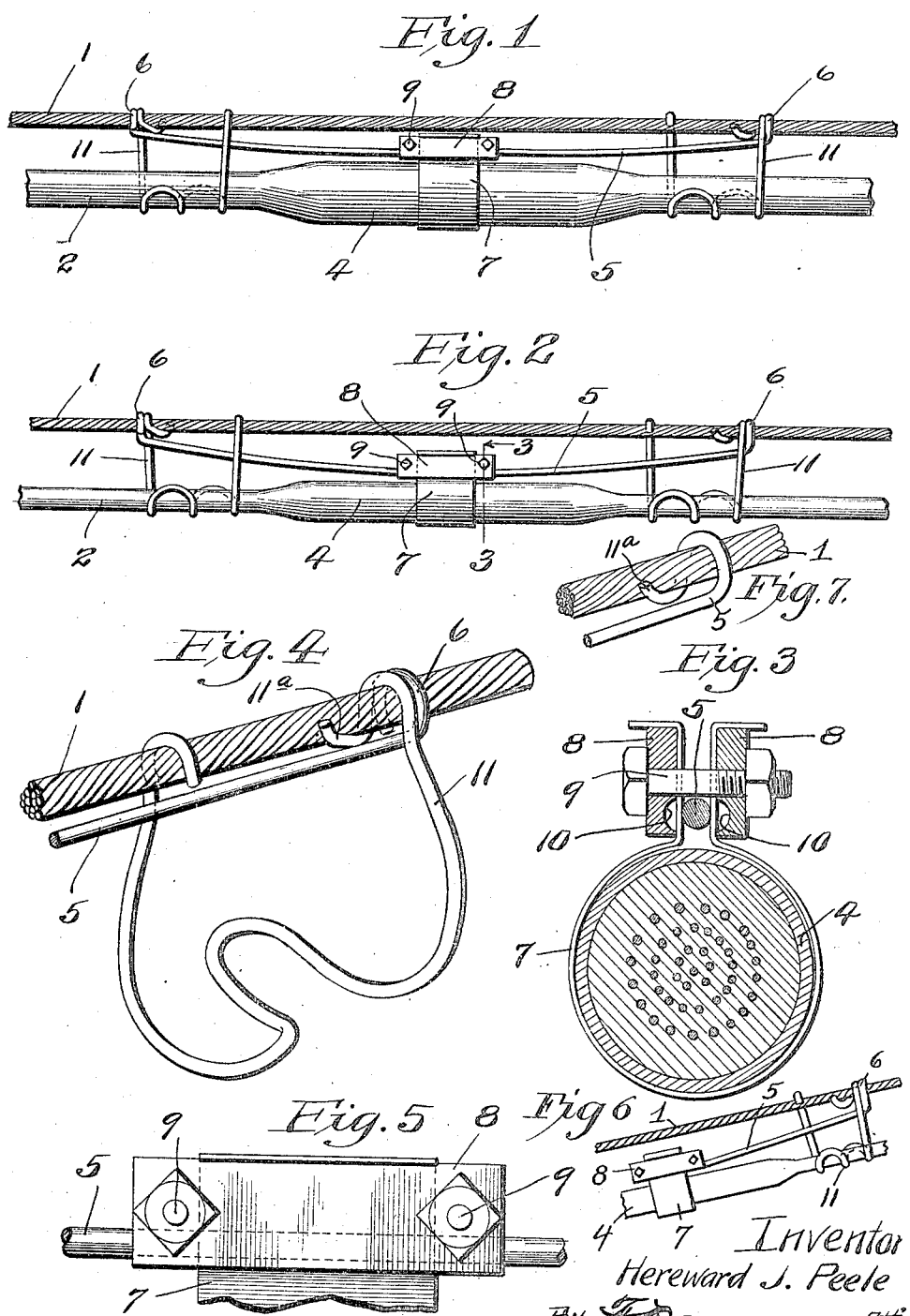
Inventor
Hereward J. Peele
By F. R. Cornwall, Atty.

UNITED STATES PATENT OFFICE.

HEREWARD J. PEELE, OF ST. LOUIS, MISSOURI.

CABLE SUSPENSION.

1,301,496.   Specification of Letters Patent.   Patented Apr. 22, 1919.

Application filed March 10, 1917. Serial No. 153,913.

*To all whom it may concern:*

Be it known that I, HEREWARD J. PEELE, a subject of the King of Great Britain and Ireland, residing at the city of St. Louis, State of Missouri, have invented a certain new and useful Improvement in Cable Suspensions, of which the following is a full, clear, and exact description, such as will enable others skilled in the art to which it appertains to make and use the same, reference being had to the accompanying drawings, forming part of this specification.

This invention relates broadly to electrical distribution, and specifically to certain improvements in means for the suspension or support of aerial cables of the sort commonly employed in telephone systems.

As is well known in practice, such cables are customarily suspended in cable hangers of various sorts from a messenger wire or strand which is supported on poles. As is also familiar in the art, the cables are built up of a number of separately insulated distribution wires incased in a flexible metallic sheath, and the diameter of the cable varies in accordance with the number of component wires included in its structure. In the installation of these cables, it is necessary in various contingencies to form splices in the cable for making electrical connections with the component current transmitting wires as, for example, in uniting the current carrying wires in separate cables, in uniting open wiring with the wires in the cable, in tapping branches into the cable, and the like. At the points where such splices are made, it is desirable to preserve the continuity of the metal sheath in the cable for the protection of the component wires, and this is accomplished by inclosing the spliced portion in a metallic sleeve which is soldered to the cable by a wipe joint or connected in other suitable fashion. Due to the increased bulk at the points where splices are made, occasioned by the connections of the individual wires and the addition of insulating material at the points of connection, these sleeves must of necessity be of considerably greater diameter than the cable in order to accommodate the spliced portions. Due to the increase of weight occasioned by this increase in size, it is necessary to securely support the sleeve from the messenger in order to prevent its sagging the cable at that point and placing injurious stresses on the spliced wires and on the joints between the sleeve and the cable sheath. As a cable is inclined to creep on the messenger, due to its expansion and contraction under temperature changes, and due to the influence of gravity on grades, it is also desirable to hold the cable firmly against such longitudinal movement, particularly at points where a branch connection is made.

It is the purpose of my invention to provide a supporting means which is designed to meet these various requirements under all of the various conditions met with in customary practice so that devices of a standard or given size and form may be used with cables and joints of all different sizes, on messengers of different gage and in conjunction with cable hangers of different types. To fulfil the requirements above specified, it is also my purpose to provide a device which will hold the cable firmly against displacement either vertically or horizontally, and which is practically indestructible by weather and other ordinary influences to which installations are ordinarily subject.

Other objects of my invention contemplate the provision of such a device which may be economically manufactured and which may be installed quickly and easily.

Other and further objects of my invention will be obvious or pointed out hereinafter, reference being had to the illustrative embodiment shown in the accompanying drawings in which—

Figure 1 shows my invention applied to a cable joint of one size;

Fig. 2 shows it applied to a cable joint of another and considerably smaller size;

Fig. 3 is a detail in the nature of a transverse section through the cable and cable clamp substantially on line 3—3 of Fig. 2;

Fig. 4 is a detail illustrating in perspective the connection between the joint hanger, cable hanger and messenger; and Fig. 5 is another detail in the nature of a partial side elevation of the joint hanger clamp.

Fig. 6 shows a modified form in use to prevent creeping on a grade;

Fig. 7 is a detail showing a modified form of the suspension member.

Referring to these illustrations by the reference characters, let it be understood that 1 represents generally the messenger upon which the cable is supported, while 2 designates the cable, and 4 designates what may be variously referred to as the splice, joint, or sleeve. It is to be understood that the cable 2 is supported from the messenger 1 by cable hangers of any conventional or suitable form.

For the purpose of supporting the enlarged joint or cable, I provide a special form of hanger which includes a vertically adjustable member 5 in the form of a ductile strand or wire having a length somewhat greater than that requisite for a splice or joint. At its extremities, this adjustable member 5 is formed with hooks 6 turned at an angle in the same direction from the member 5 and of suitable form and size to engage the messenger 1. Associated with the adjustable member 5 is a clamp member which comprises a sleeve engaging member 7 in the form of a strip of ductile metal such as zinc, movably associated jaw members 8 and adjustable retaining members 9. The jaw members 8 are in the form of plates apertured for the reception of the bolts 9 and provided with longitudinal seats or channels 10 disposed in registering relationship. As will be clearly seen upon reference to Figs. 3 and 5, the sleeve engaging member 7 is disposed so as to embrace the sleeve 4, and its extremities are brought together and passed between the jaw members 8 intermediate the seats of the retaining members 9. The adjustable member 5 is placed with its middle portion between the juxtaposed extremities of the member 7 and in alinement with the channels 10. The bolts 9 are then placed in position in the jaw members 8, and the ends of the member 7 are then turned over upon the outer margins of the jaw members 8. The nuts are then tightened on the bolts 9, which forces the jaw members 8 together, causing the strip 7 to firmly and tightly grip the sleeve 4. Any slack or looseness in the strip 7 is taken up not only by the approaching movement of the jaw members 8, but also by the take-up action which is exerted by the interposed portion of the suspension member 5 which forces portions of the strip 7 into the channels 10 as the jaws 8 are drawn together by the tightening of the bolts. Slipping of the strip 7 on the jaw members 8 is prevented by the engagement of the turned-over extremities of the latter upon the outer margins of the jaw members and by the clamping action exerted by the upper edges of the jaw members which come together to clamp the strip between them as the bolts are tightened up and before the take-up pressure is exerted on the portions over the channels 10. By virtue of this arrangement, the sleeve 4 is firmly secured to the suspension member 5, the latter being tightly gripped by the jaw members between the contiguous portions of the strip 7 whereby sleeve member 4 and suspension member 5 are held securely against relative movement.

The suspension member 5 is attached to the messenger 1 by placing its hooked extremities into engagement with the latter, and said suspension member 5 is adjusted by flexing it the proper amount to permit the sleeve 4 to assume the proper alinement with the cable. In order to maintain the suspension member 5 in proper adjustment and prevent its flexing further under the weight of the cable, and also to hold the suspension member 5 and the splice 4 against longitudinal movement relative to the messenger 1, I employ abutment members 11 which are adapted for effective engagement with the suspension member 5 and messenger 1. In the embodiment illustrated, these abutment members 11 are in the form of hangers adapted to support the cable 2 adjacent the ends of the joint, but their essential feature resides in their being immovable longitudinally of the messenger when once attached thereto. The form illustrated has a clamping end 11<sup>a</sup> which engages the messenger to prevent their relative movement. These abutment members are applied to the messenger 1 at the proper points to engage the suspension member 5 to prevent its being flexed away from the messenger and to prevent its being moved longitudinally thereof. The relationship of the two is illustrated in Fig. 4 wherein it will be seen that the hook on the extremity of the suspension member 5 rests against the outer side of one of the legs of the member 11, and that the longitudinally extending portion of the member 5 is received intermediate the two depending legs of the member 11 so as to prevent rotation of the suspension member about the messenger.

From the foregoing description, it will be observed that this device is capable of universal application, as it may be used with any size of cable or any size of joint which may be employed, the sleeve engaging member 7 being adjustable to accommodate different sizes of joints or cables and the suspension member 5 being adjustable to maintain the proper elevation of the cable. Furthermore, it is to be observed that the device may be employed in conjunction with hangers simply to prevent longitudinal movement of the cable, that it may be employed as a suspension device, or that it may be so employed as to have both functions together. Furthermore, various other arrangements of the device may suggest themselves, such as the provision of additional support by carrying the extremities of the strip 7 up over the messenger and back between the jaw members, or inverting the jaw members so that the channels 10 may be above the bolts instead of below them, and thereby permit the cable engaging portion to hang lower. In cases where the device is intended to be used simply to prevent longitudinal movement of the cable on grades, the attachment at the down-grade end of the suspension member 5 may be dispensed with, the suspension member terminating adjacent the securing member as illustrated in Fig. 6. Of course, the length of the suspension member is subject to variation. The abutment members 11 of the form shown are standard equipment; and of course other standard forms may be utilized, or the abutment members may be formed as a part of the suspension member as shown in Fig. 7. This invention provides a very economical and durable support susceptible of quick and easy application and detachment yet extremely stable and secure.

While I have illustrated and described herein what I now believe to be the best embodiment of the invention, and one which has been put in practice, I am aware that it is not the only possible embodiment, and it is my consequent intention that the appended claims comprehend other forms.

What I claim is:

1. A cable suspension device comprising an adjustable suspension member arranged for engagement with a supporting strand at points spaced apart a substantial distance longitudinally thereof, abutment members adapted to be secured to the supporting strand in coöperation with the suspension member to retain it against movement longitudinally of the supporting strand, and an attaching means between the suspension member and the suspended cable, which attaching means comprises an adjustable portion adapted to grip the supported cable and portions operable for connection with the suspension member intermediate its extremities.

2. A hanger comprising in combination a suspension member adapted for attachment at its extremities to a supporting strand, an attaching means adapted to engage the supported member and the suspension member intermediate its extremities, said suspension member being adjustable to vary the spacial relationship of the attaching means to the supporting strand, and abutment members operable for connection to the supporting strand to limit the movement of the suspension member.

3. A hanger including a suspension member having its extremities arranged for connection to a supporting strand in adjustable relationship, abutment members arranged for association with the supporting strand to retain the extremities of the suspension member against relative movement, and an attaching means mounted on the suspension member and adapted to engage a cable, said securing means being spacially adjustable relative to the supporting strand by adjustment of the suspension member.

4. A cable hanger including an adjustable securing means adapted for attachment to a supported cable, a suspension member upon which the securing means is carried, said suspension member being arranged for connection at two points with a supporting strand and adjustable to vary the spacial relationship of the securing means to the supporting strand by varying the relationship of its points of connection to said strand, and members operable for engagement with the supporting strand to limit the adjustment of the suspension member thereon.

5. In a cable suspension, the combination of a supporting strand, abutment members operable for fixed connection therewith at selective points, a securing means adjustable for connection with a supported cable, and an adjustable suspension member arranged to carry the securing means and adapted for engagement with the abutment members to limit its adjustment relative to the supporting strand.

6. In a cable suspension, the combination with a supporting strand, of abutment members operable for fixed connection therewith at selective points longitudinally thereof, an adjustable suspension member including a portion spacially adjustable relative to the supporting strand and portions adapted for engagement with the abutment members to limit its movement relative to the strand, securing means supported on the adjustable portion of the suspension member, and a member adjustably connected to said securing means and adapted to engage the supported cable.

7. A cable suspension including in combination with a supporting strand, a suspension member having connection therewith at two points spaced apart longitudinally thereof, an intermediate portion of said suspension member being flexible toward and from the supporting strand, a securing means carried on said intermediate portion and arranged for connection to a supported cable, and means associated with the suspension member at its points of connection with the supporting strand to limit its movement thereon.

8. A cable suspension including in combination with a supporting strand, a flexible suspension member arranged for support at its extremities from the strand, means associated with said extremities for retaining them against convergent movement on the strand, and means supported on the suspension member for connection to a supported cable.

9. A cable support including in combination, a supporting strand, an adjustable suspension member supported at two points on said strand and having an intermediate portion movable toward and from the same, abutment members associated with the suspension member at its points of support to retain them against convergent movement, said abutment members having portions adapted to support a cable from the strand, and means carried on the adjustable portion of the suspension member adapted for engagement with the supported cable.

10. In a cable hanger, an engaging member adjustable for engagement with the cable, relatively movable jaw members for supporting said engaging member, a suspension member associated with the jaw members, and adjustable means operable to move the jaw members to bind the engaging member upon the cable and clamp the suspension member; said engaging member, jaw members and suspension member coöperating to reduce the diameter of that portion of the engaging member which surrounds the cable when the jaw members are moved toward each other, whereby the cable is gripped by the encircled portion of said engaging member.

11. The combination with a supporting strand, of a suspension member supported at two points on said strand, cable hangers suspended from said strand and arranged so as to constitute abutments for the suspension member at its points of support, and a cable securing member adjustably arranged on the central portion of the suspension member.

12. In a cable hanger, the combination of an engaging member adjustable for engagement with a supported cable, a suspension member adapted to support the cable, and jaw members associated with the engaging member and the suspension member and operable to clamp the two together, said jaw members being formed to permit the displacement of a portion of the engaging member by the suspension member in the clamping operation.

13. In a cable hanger, a ductile member adapted to embrace a cable, jaw members adapted to coöperate with each other to clamp juxtaposed portions of the ductile member, adjustable members coöperating with said jaw members to move them to clamping position, and a supporting member adapted to be engaged between the jaw members in their clamping movement, said jaw members being provided with seat portions for the reception of the supporting member disposed to one side of a straight line connecting the adjustable members.

14. In a cable suspension including a supporting strand, a suspension member arranged for support thereon at an extremity and extending below and longitudinally of the strand, means associated with the suspension member and the strand for holding them against relative longitudinal movement, the portion of the suspension member below the strand being adjustable to and from the latter, and a securing means carried by said last mentioned portion of the suspension member, said securing means having a portion adjustable to grip a supported cable.

In testimony whereof I hereunto affix my signature in the presence of two witnesses, this 6th day of March, 1917.

HEREWARD J. PEELE.